Jan. 8, 1929.  1,698,423
F. W. BAKER
VEHICLE WHEEL
Filed Oct. 18, 1926   3 Sheets-Sheet 1

Inventor,
Frederick William Baker,
By his Attorney,
Ramsay Hoguet.

Jan. 8, 1929.  1,698,423
F. W. BAKER
VEHICLE WHEEL
Filed Oct. 18, 1926   3 Sheets-Sheet 2
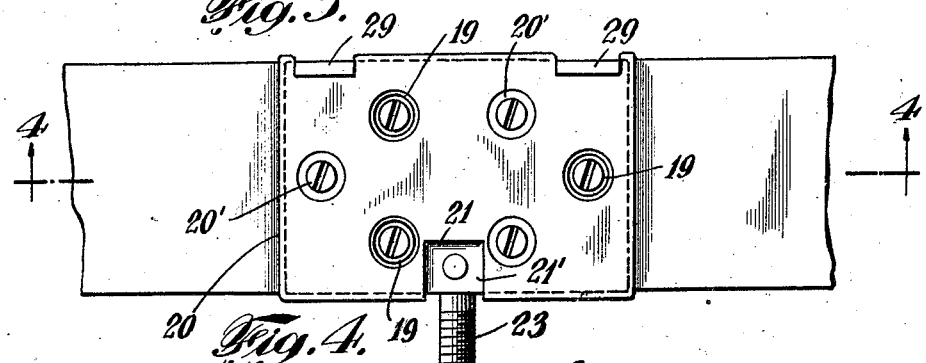
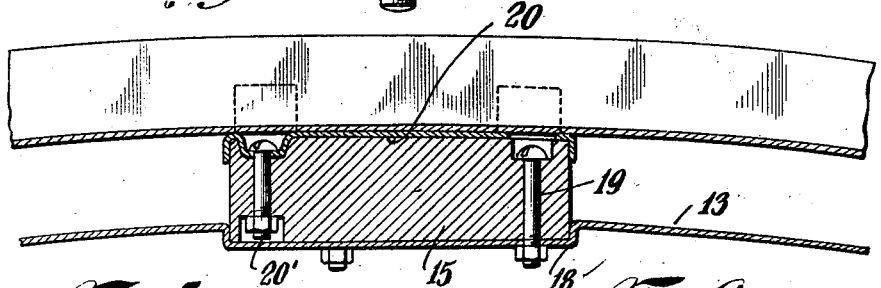
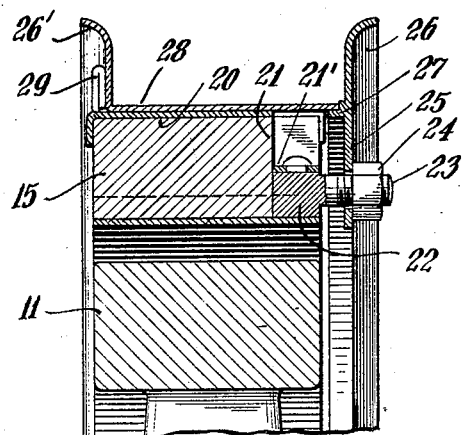
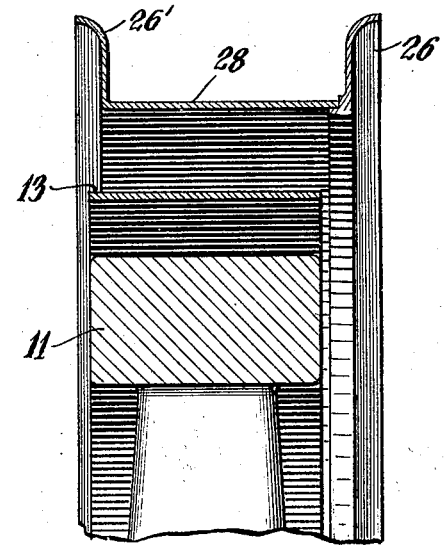
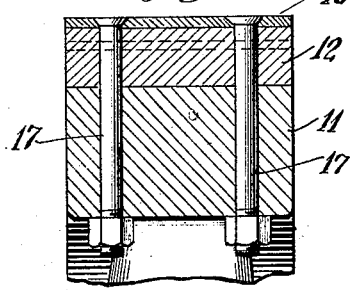
Inventor,
Frederick William Baker,
By his Attorney.
Ramsay Hoguet.

Jan. 8, 1929.  F. W. BAKER  1,698,423
VEHICLE WHEEL
Filed Oct. 18, 1926  3 Sheets-Sheet 3
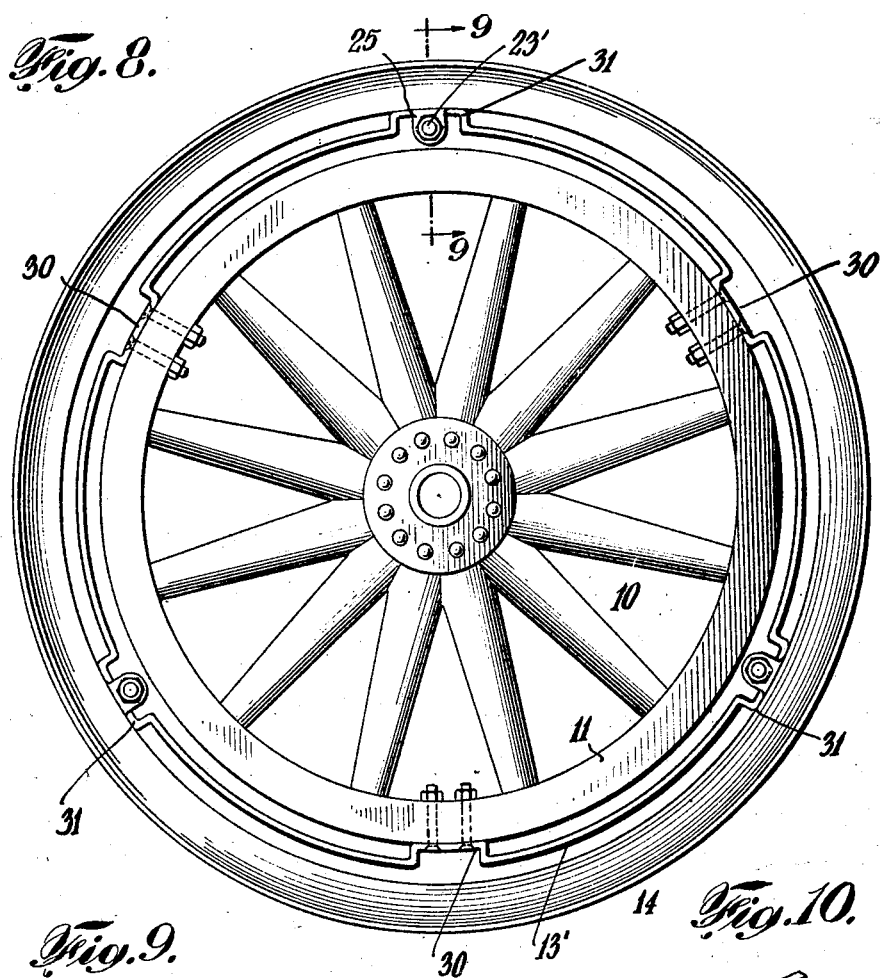
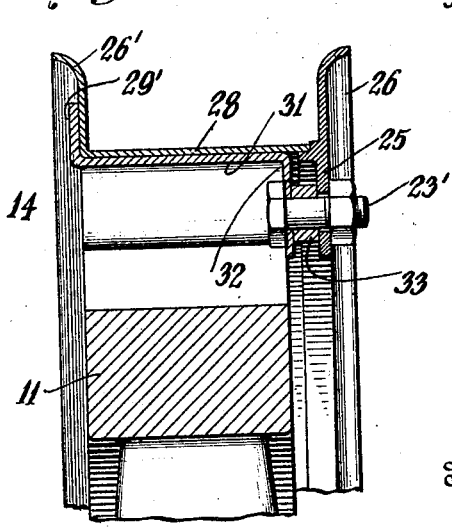
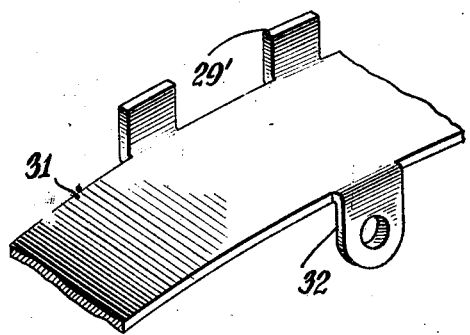
Frederick William Baker, Inventor.
By his Attorney, Ramsay Hoguet.

Patented Jan. 8, 1929.

1,698,423

UNITED STATES PATENT OFFICE.

FREDERICK WILLIAM BAKER, OF OLDSWINFORD, STOURBRIDGE, ENGLAND, ASSIGNOR TO TRINITY WHEEL CORPORATION, OF NEW YORK, N. Y., A CORPORATION OF NEW YORK.

VEHICLE WHEEL.

Application filed October 18, 1926. Serial No. 142,325.

My invention relates to improvements in vehicle wheels, and more particularly wheels which are adapted for use on motor cars. The object of my invention generally is to produce a wheel which can be made lighter and less expensive than most wheels, and which will at the same time be easier on the vehicle, and of longer life. My invention is intended to produce a wheel which will absorb and distribute road shocks and driving strains and stresses so that there will be no noticeable transmission of such shocks and strains to the car generally. In carrying out this idea I produce a wheel which is divided into a plurality of abutting sectors, none of which is disposed so as to receive any direct radial thrust from road shocks, and these are arranged to support the wheel rim, and in a somewhat resilient and easy manner transmit the driving strains. My invention is also intended to produce means for carrying out the above idea in a simple and efficient manner, and for applying the principle to conventional or any preferred type of spoke wheel, or wheels having a spoke system. Other advantages of the invention will appear from the description which follows.

Reference is to be had to the accompanying drawings forming a part of this specification, in which similar reference characters indicate corresponding parts in all the views.

Figure 3 is a face view of one of the band seats and the means for making connection with the rim.

Figure 4 is a section on the line 4—4 of Figure 3.

Figure 5 is a cross section on the line 5—5 of Figure 1.

Figure 6 is a cross section on the line 6—6 of Figure 1.

Figure 7 is a cross section on the line 7—7 of Figure 1.

Figure 8 is a side elevation of a conventional wheel showing a modified means of applying my invention thereto.

Figure 9 is a cross section on the line 9—9 of Figure 8, and

Figure 10 is a fragmentary detail perspective view illustrating means of connecting the band with the rim.

Figure 1:
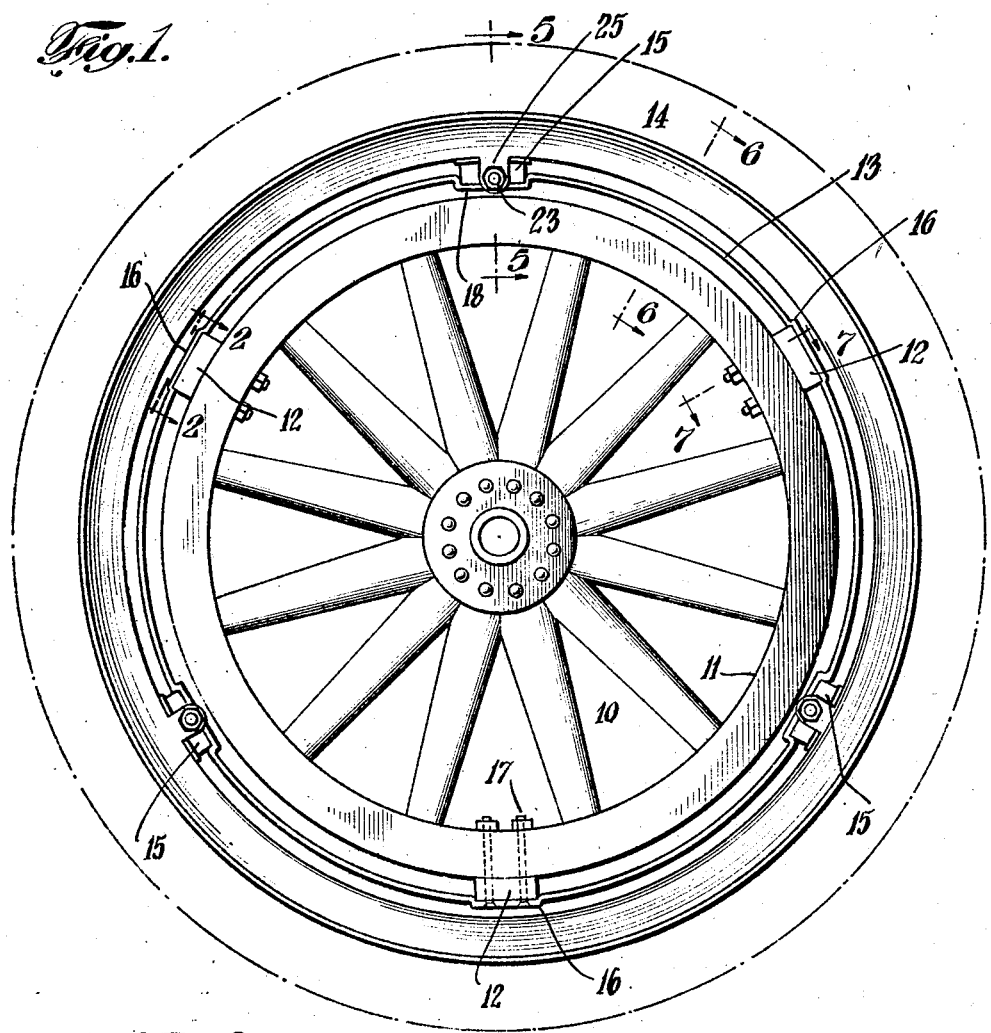
Figure 1 is a side elevation of a spoke wheel to which my improvements have been applied.
Figure 2:
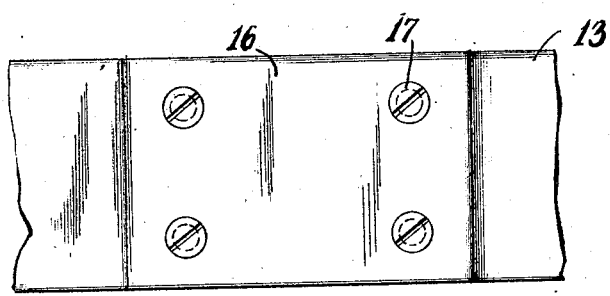
Figure 2 is a fragmentary face view on the line 2—2 of Figure 1, showing the band which is arranged between the wheel and the rim.

Referring to Figures 1 to 7, 10 represents a conventional spoke wheel of what is known as the artillery type, but so far as my invention is concerned the wheel may be of any approved kind. It has a felly 11 which is also conventional, and at a plurality of points, three as shown, the felly connects through bearing members 12 with an annular band 13 which is spaced apart from and entirely out of contact with the felly except for the connections 12. Spaced apart from the band 13 and encircling it, is a rim 14 which can be any preferred type of rim, as for example a conventional or other tire bearing rim, a kind which is best adapted for use in connection with the wheel. The rim is entirely separated from the band 13 except at bearing points 15 which are located between the bearing members 12 above referred to, and as both the bearing members 12 and 15 are preferably resilient, as for example laminated canvas which can be rubberized, it will be noted that they form slightly cushioning supports, and that as the drive is transmitted entirely from these members 12 and 15, the drive is also slightly resilient, and driving shocks and strains are not transmitted to the frame or other parts of the vehicle.

It will be noted with reference to Figure 1 and the description already given, that the wheel is divided into a plurality of sectors of essentially triangular shape, each comprising the portion between two of the bearing members 12 and one of the bearing members 15, and it will be further noted that the bearing members 12 are disposed radially opposite the space between the wheel spokes so that no rim bearing sector of the wheel receives any direct radial thrust. For example if there is a thrust in the form of a blow which would ordinarily be transmitted by a conventional wheel to the vehicle, it will be received by two of the members 15, then transmitted through the band 13 to one or more of bearing members 12, and will thus be distributed through a greater part of the wheel, and will be substantially absorbed so that no noticeable shock will be transmitted to the vehicle as a whole. Thus it will be seen that the invention can be easily applied to a conventional or other type of wheel, so that the shocks incident to driving will be practically absorbed.

It follows, therefore that the wheel can be made light and inexpensive, and will be exceptionally strong because of the distribution of shocks and strains as above pointed out.

It will be understood from the description given that the band 13 which forms the connecting, and what might be termed a floating medium between the wheel and rim, can have many means of application so as to divide it into sectors, and have each sector from a somewhat resilient support for the rim. As illustrated in Figure 1, the band 13 is provided with outwardly offset seats 16 to receive the members 12, and these are bolted to the felly 11 by bolts 17 (see Figure 7) which extend through the band and felly.

For supporting the bearing members 15 the band is provided with inwardly offset seats 18, and the members 15 are arranged so as to provide for a demountable rim, although they might support the rim in any approved fashion without departing from the invention.

The members 15 are preferably arranged so as to be rigidly secured to the band 13, and also firmly secured to the rim 14, but the fastenings to the band and rim should be independent so that the drive will be wholly through the members 15. To this end I have shown by way of example screw bolts 19 fastening each member 15 to its seat 18 in the band 13, and each member 15 is also provided with a cap 20 which is secured to the member 15 by bolts 20'. Each member 15 is also slotted on the outer side as shown at 21, and the cap 20 is bent downward into the slot as shown at 21', and bears upon the head block 22 of a bolt 23 which is provided with a nut 24 and arranged to engage a corresponding lug 25 on the detachable rim flange 26 (see Figure 5). This can be provided with an annular shoulder 27 to receive the tire bearing bed 28 having a conventional flange 26' complementary to the flange 26. The flange 26' engages the upturned lugs 29 on the cap 20. Thus when the nuts 24 on the several bearers 15 are removed, the flange 26 can be taken off and the bed 28 and its tire also pulled off the wheel. The particular demountable support illustrated is not here claimed, but is simply shown by way of example, the invention being in this case directed to the application of the principle described to conventional or other spoke wheels.

In Figures 8 to 10 I have shown a slight modification of the invention, illustrating a simpler form of its application to a wheel like the wheel 10. In this case the band 13' has inwardly offset portions 30 directly attached to the felly 11 and outwardly offset portions 31 directly attached to the rim 14. In this case the part 31 of the band 13' has at one edge outturned lugs 29' to engage the flange 26', and at the opposite edge an inturned lug 32 to engage the bolt 23' which is used to fasten the flange 26 in place. When thus applied a washer 33 is placed between the lug 32 and the lug 25 as in Figure 9.

From the foregoing description it will be seen that the invention is exceedingly simple, that it can be applied to an ordinary vehicle wheel so as to produce the effect described, and that many means of attachment between the band 13' and the rim of the wheel, or between the band and the wheel felly might be used without affecting the invention, but it should be borne in mind that the important things are to have the connections between the band and wheel disposed opposite the spaces between the spokes, and to have the connection between the band and the rim between the aforesaid connections between the band and felly, so that there will be a certain cushioning effect on this part of the band which will be confined to the immediate sector represented by the adjacent connections with the felly and radial lines drawn from such connections to the wheel center. Thus the shocks are absorbed and distributed as specified.

While it is important to have the connections between the band 13' and the rim felly at points between the spokes, I do not limit the invention to this arrangement because a beneficial effect would be had even though the band were applied to the felly and supported at a plurality of points in spaced relation, and the rim were supported from the band in the manner stated.

From the foregoing description and the drawings, it will be seen that my improved wheel is in no sense a spring wheel of the kind in which the outer rim has a bodily movement with reference to the wheel center and in which noticeable deformation of the wheel occurs when it strikes an obstacle, but my wheel in such an instance limits the shock to the individual sector which happens to be opposite the obstacle and the shock is limited to the sector defined by one of the connections 15 and two of the bearers or connections 12. Thus no deformation of the wheel is noticeable but the shock is absorbed by the outer rim, band 13 and bearers 12 and 15.

I claim:—

1. A vehicle wheel having a felly, a band spaced apart from the felly and substantially concentric therewith, said band having offset portions connected thereto at points radially between the spoke functioning parts of the wheel in a manner to substantially limit the flattening tendency of the band to the sector between its points of connection with the felly, and a rim spaced apart from the band and connected thereto only at points between the band and felly connections.

2. A vehicle wheel having spokes and a felly, a band spaced apart from the felly and substantially concentric therewith, said band having offset portions connected thereto only at points radially opposite the spaces between the spokes and with its radial movement substantially limited to sectors between said connecting points, and a rim spaced apart from the band and connected thereto only at points between the band and felly connections.

3. A vehicle wheel having an annular band spaced apart from the spoke system of the wheel and substantially concentric therewith, said band having offset portions connected thereto only at intervals and in a manner to prevent substantial radial movement of the band except between two such points of connection, and a rim spaced apart from the band and connected thereto only at points between the connections of the band and spoke system, said rim being substantially limited in its radial movement to sectors between its points of connection with the band.

4. A vehicle wheel having a felly, a band spaced apart from the felly and substantially concentric therewith, said band having offset portions connected thereto only at spaced intervals, resilient supports forming the connections between the band and felly and disposed so as to limit the radial movement of the band to sectors between said supports, a rim spaced apart from the band, and resilient members forming the only connection between the rim and band, said members being located between the band and felly connections.

5. A vehicle wheel having a felly, a band spaced apart from the felly and substantially concentric therewith, said band having offset portions, means connecting said offset portions with the felly, and a rim spaced apart from the band and connected thereto only at points between the band and felly connections.

6. A vehicle wheel having a felly, a band spaced apart from the felly and substantially concentric therewith, said band having a series of seats to connect with the felly, and a series of seats located between the first mentioned seats, and a rim supported on the second series of seats.

In testimony whereof, I have signed my name to this specification this 14th day of October, 1926.

FREDERICK WILLIAM BAKER.